United States Patent Office 3,451,480
Patented June 24, 1969

3,451,480
FRICTION LOSS REDUCING
Herbert J. Zeh, Jr., and Alan E. Bischof, Pittsburgh, Pa., assignors, by mesne assignments, to Calgon Corporation, a corporation of Delaware
No Drawing. Filed Apr. 19, 1967, Ser. No. 631,857
Int. Cl. E21b *43/26;* F17d *1/16;* C08g *15/00*
U.S. Cl. 166—308     7 Claims

ABSTRACT OF THE DISCLOSURE

Reduction of friction loss in oil well fracturing is accomplished through the addition of small amounts of copolymers of acrylamide and diacetone acrylamide, with and without crosslinking.

BACKGROUND OF THE INVENTION

This invention relates to the art of reducing energy loss during the flow of fluids through pipes, which by common usage in oilfield terminology has become known as "friction reduction." Our invention is particularly directed to friction reduction in brines and fresh water used in fracturing operations. It may also be useful in firefighting and to reduce energy loss in hydraulic control systems.

Such polymers as sodium polystyrene sulfonate, polyethylene oxide and polyacrylamide have been proposed for friction reduction in oilfield usage. See U.S. Patents 3,023,760; 3,254,719 and 3,102,548 as examples. See also "Studies of the Reduction of Pipe Friction With the Non-Newtonian Additive CMC," by Riphen and Pelch, a Department of Commerce publication dated April 1963.

In fracturing an earth formation penetrated by a well, an aqueous or other fluid is injected through the well into the earth formation at a high velocity to cause fracturing of the formation. Friction reducing polymers are added to reduce turbulence and consequent energy loss in the flow of the fluid from the surface to the formation.

Polyacrylamide is used as a friction reducing agent perhaps more than other material. See Root, U.S. Patent 3,254,719. However, it is not as versatile as could be hoped. An ideal friction reducing polymer is one which is compatible not only with fresh water but also sodium chloride and calicum chloride brines.

SUMMARY OF THE INVENTION

We have found that copolymers of acrylamide and diacetone acrylamide are useful as friction reducers in calcium chloride brines as well as fresh water and sodium chloride brines. See U.S. Patent 3,277,056 for a description of diacetone acrylamide and its derivatives. The compound is referred to the U.S. Patent 3,277,056 as an N-3-oxohydrocarbon-substituted acrylamide, having the formula

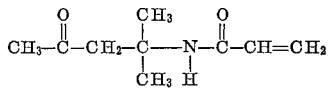

The polymers we use employ 0.1% to about 65%, by weight, of diacetone acrylamide.

Table I shows the results of several tests in a laboratory friction reduction test. The test is run in a standard friction reduction loop, in which the "friction reduction" is calculated from pressure loss measurements taken on a 0.0024% solution of the test material passing through a tube of known length and diameter. In the tables presented herein, the term "Acryl/DAA ratio" means the weight ratio of acrylamide to diacetone acrylamide in the monomer mixture used to prepare the polymer, "percent hydr." means the percent of the free amide groups which were hydrolyzed to the acid form, "Max. F/R" means the maximum friction reduction achieved at any time during the test, "F/R at — min." means the friction reduction in percent at the stated time after beginning the test. In each case the degree of friction used as a base is that generated by an untreated fluid. In Table I, tests are presented for tap water, 2% CaCl$_2$, and 10% NaCl.

TABLE I

| Acryl/ DAA ratio | Percent Hydr. | Max. F/R (percent) | F/R at 5 min. (percent) | F/R at 10 min. (percent) | F/R at 15 min. (percent) |
|---|---|---|---|---|---|
| Tap water | | | | | |
| 97.5/2.5 | None | 70.0 | 67.3 | 61.4 | |
| 95.0/5.0 | None | 61.8 | 60.2 | 56.8 | |
| 90.0/10.0 | None | 68.7 | 67.5 | 64.0 | 61.3 |
| 95.0/5.0 | 35.5 | 75.0 | 72.8 | 72.5 | 72.5 |
| 90.0/10.0 | 32.9 | 69.5 | 68.3 | 68.3 | 68.2 |
| 2% CaCl$_2$ | | | | | |
| 97.5/2.5 | None | 68.7 | 66.5 | 61.0 | 57.4 |
| 95.0/5.0 | None | 64.0 | 63.0 | 59.2 | 56.3 |
| 90.0/10.0 | None | 64.6 | 64.0 | 61.0 | 58.4 |
| 95.0/5.0 | 35.5 | 65.8 | 44.6 | | |
| 90.0/10.0 | 32.9 | 62.2 | 52.0 | 42.0 | 35.0 |
| 10% NaCl | | | | | |
| 97.5/2.5 | None | 69.9 | 69.0 | 65.7 | 62.2 |
| 95.0/5.0 | None | 65.0 | 64.0 | 61.3 | 59.0 |
| 90.0/10.0 | None | 64.0 | 64.0 | 62.1 | 60.1 |
| 95.0/5.0 | 35.5 | 72.2 | 71.1 | 70.9 | 70.1 |
| 90.1/10.0 | 32.9 | 69.2 | 68.5 | 68.2 | 67.7 |

Our polymers should be hydrolyzed for best performance, as can be seen from the foregoing table, although the unhydrolyzed form may be satisfactory for certain purposes. We prefer that at least about 10% of the amide groups of the acrylamide moiety should be hydrolyzed. At least about 0.1% diacetone acrylamide should be used. Up to 65% diacetone acrylamide may be used to achieve a still significant friction reduction. We prefer to utilize at least 2.5% and no more than about 60% diacetone acrylamide. The polymer should have a molecular weight of at least 100,000.

Table II illustrates the effectiveness of various acrylamide/diacetone acrylamide copolymers in 2% CaCl$_2$, using 0.0024% of the polymer. The polymers were not hydrolyzed.

TABLE II.—FRICTION REDUCTION EFFECTS OF VARIOUS ACRYL/DAA COPOLYMERS IN 2% CaCl$_2$

| Acryl/ DAA ratio | Max. F/R (percent) | F/R at 5 min. (percent) | F/R at 10 min. (percent) | F/R at 20 min. (percent) | F/R at 30 min. (percent) |
|---|---|---|---|---|---|
| 90/10 | 73.5 | 69.0 | 65.0 | 59.8 | 56.2 |
| 90/10 | 73.1 | 68.2 | 63.9 | 58.3 | 55.0 |
| 80/20 | 70.5 | 64.4 | 60.8 | 56.5 | 53.8 |
| 80/20 | 72.5 | 69.2 | 65.4 | 60.6 | 57.2 |
| 40/30 | 71.2 | 66.2 | 63.0 | 58.6 | 56.0 |
| 70/30 | 59.0 | 58.0 | 56.2 | 52.8 | 49.8 |
| 60/40 | 63.8 | 58.2 | 55.5 | 52.5 | 50.0 |
| 70/40 | 72.3 | 70.0 | 67.8 | 63.8 | 61.0 |
| 60/50 | 68.0 | 61.0 | 57.8 | 53.9 | 51.2 |
| 50/50 | 72.2 | 68.3 | 64.8 | 60.2 | 57.1 |
| 50/60 | 60.0 | 54.5 | 51.8 | 58.1 | 45.5 |
| 40/60 | 71.0 | 67.0 | 62.0 | 57.0 | 54.0 |

The acrylamide-diacetone acrylamide copolymers used in this invention are made in the conventional manner, such as a conventional redox catalyst system, for homo-polyacrylamide. See U.S. Patent 3,277,056 for other co-polymerization methods. Up to 0.006% N,N'-methylene bisacrylamide may be included as a cross-linking agent.

There is no reason to believe that there is a minimum quantity which must be used to achieve some friction reduction effect in rapidly flowing aqueous systems. A very small amount (i.e. about 0.001 weight percent) of polymer having a molecular weight of at least 100,000 will have a slight effect. For practical purposes, it may be said that to achieve 50% friction reduction, at least 0.0006% polymer having a molecular weight greater than 100,000 should be used. Economics will dictate the practical maximum long before the solution becomes too viscous to be practical; however, in most cases, 0.0024% will be the maximum amount required to produce a commercially significant effect.

We do not intend to be limited to the particular examples and illustrations described above. Our invention may be otherwise practiced within the scope of the following claims.

We claim:

1. Method of reducing friction loss due to turbulent flow of an aqueous fracturing fluid in an oilfield fracturing process comprising adding to said fracturing fluid a copolymer of (a) acrylamide, (b) diacetone acrylamide and (c) up to about 0.006 weight percent of N,N'-methylene bisacrylamide, in an amount sufficient to reduce friction loss.

2. Method of claim 1 in which the diacetone acrylamide comprises, by weight, about 2.5% to 60% by weight of the copolymer.

3. Method of claim 1 in which the unsubstituted amide groups of the copolymer are hydrolyzed to the extent of 10% to 40%.

4. In the process of fracturing an earth formation penetrated by a well, wherein an aqueous fracturing fluid is injected through the well into the earth formation at a high velocity to cause fracturing of the formation, the improvement of decreasing the friction loss in the flow of the aqueous fracturing fluid which comprises adding to the fracturing fluid prior to injection 0.001 to 0.5 weight percent of a polymer made from a monomer mix consisting essentially of, by weight, (a) at least 40% acrylamide, (b) up to about 0.006 N,N'-methylene bisacrylamide, and (c) at least 0.1% diacetone acrylamide.

5. Method of reducing friction loss in an aqueous liquid flowing through a pipe comprising dissolving in said liquid an effective amount of a polymer having a molecular weight of at least 100,000 made from a monomer mix comprising (a) a compound of the formula

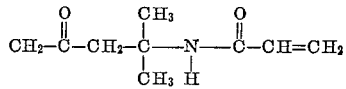

(b) up to about 97.5% by weight acrylamide, and (c) up to about 0.006% by weight N,N'-methylene bisacrylamide.

6. Method of claim 5 in which at least about 0.0006% by weight polymer is used, based on the weight of the liquid treated.

7. Method of claim 5 in which at least about 10% of the free amide groups are hydrolyzed to carboxylic acid groups.

References Cited

UNITED STATES PATENTS

| | | | |
|---|---|---|---|
| 3,102,548 | 9/1963 | Smith et al. | |
| 3,254,719 | 6/1966 | Root | 166—42 |
| 3,277,056 | 10/1966 | Coleman | 260—63 |
| 3,336,979 | 8/1967 | Ingraham et al. | 166—33 |
| 3,370,650 | 2/1968 | Watanabe | 166—42 |

CHARLES E. O'CONNELL, *Primary Examiner.*

IAN A. CALVERT, *Assistant Examiner.*

U.S. Cl. X.R.

137—13; 260—63

UNITED STATES PATENT OFFICE
CERTIFICATE OF CORRECTION

Patent No. 3,451,480                                              June 24, 1969

Herbert J. Zeh, Jr., et al.

It is certified that error appears in the above identified patent and that said Letters Patent are hereby corrected as shown below:

Column 1, line 53, "the" should read -- in --. Column 2, TABLE II, first column, line 5 thereof, "40/30" should read -- 70/30 --; same table, first column, line 8 thereof, "70/40" should read -- 60/40 --; same table, first column, line 9 thereof, "60/50" should read -- 50/50 --; same table, first column, line 11 thereof, "50/60" should read -- 40/60 --.

Signed and sealed this 21st day of April 1970.

(SEAL)
Attest:

Edward M. Fletcher, Jr.                                       WILLIAM E. SCHUYLER, JR.
Attesting Officer                                                   Commissioner of Patents